United States Patent
Imakita et al.

(10) Patent No.: US 7,638,449 B2
(45) Date of Patent: Dec. 29, 2009

(54) OPTICAL GLASS

(75) Inventors: Kenji Imakita, Tokyo (JP); Jun Sasai, Tokyo (JP); Naoki Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/192,149

(22) Filed: Aug. 15, 2008

(65) Prior Publication Data

US 2008/0318758 A1  Dec. 25, 2008

Related U.S. Application Data

(63) Continuation of application No. PCT/JP2007/053109, filed on Feb. 20, 2007.

(30) Foreign Application Priority Data

Feb. 20, 2006  (JP) .............................. 2006-042529

(51) Int. Cl.
- C03C 3/15 (2006.01)
- C03C 3/14 (2006.01)
- C03C 3/155 (2006.01)
- C03C 3/062 (2006.01)
- C03C 3/064 (2006.01)
- C03C 3/068 (2006.01)
- C03C 3/066 (2006.01)

(52) U.S. Cl. .............................. 501/50; 501/49; 501/51; 501/73; 501/77; 501/78; 501/79

(58) Field of Classification Search .................... 501/49, 501/50, 51, 73, 77, 78, 79

See application file for complete search history.

(56) References Cited

U.S. PATENT DOCUMENTS

2003/0100433 A1 * 5/2003 Hayashi et al. ............... 501/79
2007/0232477 A1 * 10/2007 Fujiwara ...................... 501/50
2008/0312062 A1 * 12/2008 Sasai et al. ................... 501/50

FOREIGN PATENT DOCUMENTS

| JP | 60-221338 | | 11/1985 |
|---|---|---|---|
| JP | S60221338 A | * | 11/1985 |
| JP | 62-100449 | | 5/1987 |
| JP | S62100449 A | * | 5/1987 |
| JP | 05-201743 | | 8/1993 |
| JP | 08-026766 | | 1/1996 |
| JP | 8-59282 | | 3/1996 |
| JP | H08059282 A | * | 3/1996 |
| JP | 8-217484 | | 8/1996 |
| JP | 2000-016831 | | 1/2000 |
| JP | 2000-119036 | | 4/2000 |
| JP | 2005-154251 | | 6/2005 |

OTHER PUBLICATIONS

U.S. Appl. No. 12/192,149, filed Aug. 15, 2008, Imakita et al.
U.S. Appl. No. 12/195,477, filed Aug. 21, 2008, Sasai et al.
U.S. Appl. No. 12/273,574, filed Nov. 19, 2008, Imakita et al.
U.S. Appl. No. 12/332,589, filed Dec. 11, 2008, Sasai et al.
U.S. Appl. No. 12/404,026, filed Mar. 13, 2009, Imakita et al.
U.S. Appl. No. 12/404,039, filed Mar. 13, 2009, Sasai.

* cited by examiner

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57) ABSTRACT

This invention provides an optical glass including, by mass %: 30 to 40% of $B_2O_3$; 2.5 to 6% of $Li_2O$; 10 to 17% of ZnO; 12 to 22% of $La_2O_3$; 15 to 25% of $Gd_2O_3$; 0 to 5% of $SiO_2$; 0 to 5% of $Bi_2O_3$; 0 to 15% of $Al_2O_3$; 0 to 3% of $ZrO_2$; 0 to 5% of $WO_3$; 0 to 5% of $Ta_2O_5$; 0 to 3% of $TiO_2$; 0 to 5% of $Y_2O_3$; and 0 to 5% of MgO+CaO+SrO+BaO.

20 Claims, No Drawings

OPTICAL GLASS

TECHNICAL FIELD

This invention relates to an optical glass suitable for precision press molding.

BACKGROUND ART

Recently, precision optical apparatuses such as a digital camera and a video camera have been increased in performance and downsized remarkably. Due to the realization of high performance and downsizing, there is a demand for optical elements such as an optical lens that are downsized, highly integrated, and capable of high performance to be used in the optical apparatuses. Among the optical elements, an aspherical lens is taking a major role in optical designing because use of a single aspherical lens realizes aberration elimination that has heretofore been realized by using plural spherical lenses and enables the high integration of optical system. In order to realize higher integration, there is an increasing demand particularly for an aspherical lens having a high refraction low dispersion property.

In an optical element molding method, a precision press molding method wherein a press molding surface is used as it is without polishing or the like attracts attention. The precision press molding method is a method of press-molding an optical glass gob called pre-form at a temperature higher than a glass transition point (Tg) by using a metal mold having a highly precise molding surface of a desired shape, and the precision press molding method is an important molding method that enables bulk production of the aspherical lens.

A releasing film or the like is formed on a surface of the metal mold used in the precision press molding for the purpose of preventing adhesion of optical glass. Because deterioration of the releasing film is accelerated along with an increase in temperature and a film formation cost for the releasing film is high, there is a demand for an optical glass that can be molded at a low temperature, i.e., having a low glass transition temperature.

Boric acid-based glasses have heretofore been proposed as the optical glass having a low transition temperature in the field of high refraction (refractive index nd: 1.65 to 1.72) and low dispersion (Abbe number vd: 47 to 57) as disclosed in Patent Documents 1 and 2. However, the optical glasses disclosed in the publications have a problem of a lack in mass productivity due to its high liquid phase temperature (L.T.) and tendency to cause devitrification in the case of forming a pre-form thereof.

Though boric acid-based glasses obtained by improving the formerly mentioned boric acid-based glasses have been proposed by Patent Documents 3 and 4, the proposed optical glasses have a large linear thermal expansion coefficient and have a problem that an yield tends to be lowered since the glass is easily cracked due to heat shrinkage during press molding.

Patent Document 1: JP-A-8-26766
Patent Document 2: JP-A-5-201743
Patent Document 3: JP-A-2000-119036
Patent Document 4: JP-A-2000-16831

DISCLOSURE OF THE INVENTION

Problems to be Resolved by the Invention

An object of this invention is to provide an optical glass having a high refraction low dispersion property, a low glass transition temperature, a low liquid phase temperature, and a low linear thermal expansion coefficient and being suitable for precision press molding.

Means of Solving the Problems

The inventors of this invention have conducted extensive researches for the problems to find that it is possible to attain the above object by an optical glass described in the following, thereby accomplishing this invention.

(1) An optical glass comprising, by mass %: 30 to 40% of $B_2O_3$; 2.5 to 6% of $Li_2O$; 10 to 17% of ZnO; 12 to 22% of $La_2O_3$; 15 to 25% of $Gd_2O_3$; 0 to 5% of $SiO_2$; 0 to 5% of $Bi_2O_3$; 0 to 15% of $Al_2O_3$; 0 to 3% of $ZrO_2$; 0 to 5% of $WO_3$; 0 to 5% of $Ta_2O_5$; 0 to 3% of $TiO_2$; 0 to 5% of $Y_2O_3$; and 0 to 5% of MgO+CaO+SrO+BaO.

(2) The optical glass according to item (1), wherein a refractive index (nd) is 1.65 to 1.72 and an Abbe number (vd) is 47 to 57.

(3) The optical glass according to item (1) or (2), wherein a glass transition temperature (Tg) is 580° C. or less.

(4) The optical glass according to item (1), (2), or (3), wherein a liquid phase temperature (L.T.) is 950° C. or less.

(5) The optical glass according to any one of items (1) to (4), wherein a viscosity ($\eta_{L.T.}$) at the liquid phase temperature (L.T.) is $10^{0.5}$ to $10^{2.4}$ dPa·s.

(6) The optical glass according to any one of items (1) to (5), wherein an average linear thermal expansion coefficient ($\alpha$) from 50° C. to 350° C. is $85\times10^{-7}$/° C. or less.

Advantageous Effects of the Invention

The optical glass of this invention (hereinafter referred to as this glass) has optical characteristics of the high refractive index and the low dispersion by comprising as essential components $B_2O_3$, $Li_2O$, ZnO, $La_2O_3$, and $Gd_2O_3$. According to this glass, it is possible to achieve optical characteristics of the refractive index nd of 1.65 to 1.72 and the Abbe number vd of 47 to 57.

According to this glass, since it is possible to achieve the glass transition temperature of 580° C. or less, a degree of deterioration of a film on a surface of a metal mold is suppressed to result in improvement in durability of the metal mold, thereby largely increasing productivity.

Also, according to this glass, since it is possible to achieve the liquid phase temperature of 950° C. or less, devitrification of the optical glass hardly or never occurs, thereby largely increasing productivity. Further, according to this glass, since it is possible to achieve the average linear thermal expansion coefficient ($\alpha$) of $85\times10^{-7}$/° C. or less, glass cracking hardly or never occurs during press molding, thereby contributing to improvement in yield.

BEST MODE FOR CARRYING OUT THE INVENTION

Reasons for the above-described ranges of the components of this glass are as follows.

$B_2O_3$ is a main ingredient for forming reticulation of glass, and this glass comprises 30 mass % (hereinafter, mass % will be abbreviated to %) or more of $B_2O_3$ for the purpose of stabilizing glass and improving an anti-devitrification. A content of $B_2O_3$ may preferably be 34% or more, more preferably 35% or more. Since the refractive index is decreased when the $B_2O_3$ content is too large, the $B_2O_3$ content is 40% or less in this glass. The $B_2O_3$ content may preferably be 39% or less, more preferably 38% or less.

In this glass, $La_2O_3$ and $Gd_2O_3$ are essential components for imparting the high refractive index. In order to achieve the desired refractive index, a content of $La_2O_3$ is set to 12% or more, and a content of $Gd_2O_3$ is set to 15% or more in this glass. The anti-devitrification property is deteriorated to cause devitrification easily when the $La_2O_3$ content and the $Gd_2O_3$ content are too large. Therefore, in order to achieve the desired anti-devitrification property, the $La_2O_3$ content is set to 22% or less, and the $Gd_2O_3$ content is set to 25% or less.

In this glass, from the view point of a balance between the refractive index and the anti-devitrification property, the $La_2O_3$ content may preferably be 15% or more, more preferably 16% or more. For the same reason, the $La_2O_3$ content may preferably be 19% or less, more preferably 18% or less. In this glass, from the view point of a balance between the refractive index and the anti-devitrification, the $Gd_2O_3$ content may preferably be 16% or more, more preferably 18% or more. For the same reason, the $Gd_2O_3$ content may preferably be 21% or less, more preferably 20% or less.

$Li_2O$ is remarkably effective for lowering the glass transition temperature and serves as an essential component in this glass. However, the linear thermal expansion coefficient is increased with an increase in content of $Li_2O$. Therefore, in order to achieve the desired glass transition temperature and the linear expansion coefficient, the $Li_2O$ content is set to 2.5% to 6%. In order to achieve the desired glass transition temperature and the linear expansion coefficient suitable for press molding, the $Li_2O$ content may preferably be 2.8% or more, more preferably 3% or more. For the same reason, the $Li_2O$ content may preferably be 5% or less, more preferably 4% or less.

ZnO is effective for maintaining the high refractive index and reducing the glass transition temperature and the linear thermal expansion coefficient and is an essential component in this glass. In order to achieve the desired effect, a content of ZnO is 10% or more in this glass. Since devitrification occurs easily when the ZnO content is too large, the ZnO content in this glass is 17% or less. The ZnO content in this glass may preferably be 12% or more, more preferably 13.5% or more. The ZnO content may preferably be 16% or less, more preferably 15.5% or less.

In this glass, $SiO_2$ is as an arbitrary component that is capable of maintaining the anti-devitrification property while adjusting the optical characteristics. In order to achieve the effect, a content of $SiO_2$ may preferably be 0.1% or more. Since it is difficult to perform the press molding due to an increase in glass transition temperature when the $SiO_2$ content is too large, the $SiO_2$ content may preferably be 5% or less, more preferably 4.3% or less.

In this glass, BaO, MgO, CaO and SrO are arbitrary components that are capable of maintaining the anti-devitrification property and a low temperature softening property while adjusting the optical characteristics. In order to achieve the effect, a content of each of BaO, MgO, CaO and SrO or a sum of the contents of BaO, MgO, CaO and SrO in this glass may preferably be 0.1% or more. Since the linear thermal expansion coefficient becomes too large when the contents of the components are too large, the content of each of BaO, MgO, CaO and SrO or the sum of the contents of BaO, MgO, CaO and SrO in this glass may preferably be 5% or less, more preferably 3% or less.

In this glass, $Na_2O$ and $K_2O$ are arbitrary components that are capable of maintaining the low temperature softening property while adjusting the optical characteristics. In order to achieve the effect, a content of each of $Na_2O$ and $K_2O$ or a sum of the contents of $Na_2O$ and $K_2O$ in this glass may preferably be 0.1% or more. Since a chemical endurance can be diminished when the contents of the components are too large, the content of each of $Na_2O$ and $K_2O$ or the sum of the contents of $Na_2O$ and $K_2O$ in this glass may preferably be 5% or less, more preferably 3% or less.

In this glass, $Bi_2O_3$, $ZrO_2$, $WO_3$, $Ta_2O_5$, $TiO_2$, and $Y_2O_3$ are arbitrary components that are capable of imparting the high refractive index. In order to achieve the effect, a content of each of $Bi_2O_3$, $ZrO_2$, $WO_3$, $Ta_2O_5$, $TiO_2$, and $Y_2O_3$ in this glass may preferably be 0.1% or more. When the contents of these components become too large, the anti-devitrification property is deteriorated. The content of each of $Bi_2O_3$, $WO_3$, $Ta_2O_5$, and $Y_2O_3$ in this glass may preferably be 7% or less, more preferably 5% or less. Also, the content of each of $TiO_2$ and $ZrO_2$ may preferably be 3% or less, more preferably 2% or less.

In this glass, $Al_2O_3$ is an arbitrary component that adjusts the optical characteristics and improves the chemical endurance. In order to achieve the effect, a content of $Al_2O_3$ may preferably be 0.1% or more. Since the anti-devitrification property is reduced to be subject to devitrification when the $Al_2O_3$ content is too large, the $Al_2O_3$ content in this glass may preferably be 15% or less, more preferably 10% or less, particularly preferably 5% or less.

In this glass, $Sb_2O_3$ is an arbitrary component for clarity. In order to achieve the effect, a content of $Sb_2O_3$ may preferably be 0.1% or more. The $Sb_2O_3$ content in this glass may preferably be 1% or less.

In this glass, it is preferable not to contain any of PbO, $As_2O_3$, and $TlO_2$.

As the optical characteristics of this glass, the refractive index nd may preferably be 1.65 or more. The refractive index nd may more preferably be 1.67 or more, particularly preferably 1.68 or more. In order to achieve the low dispersion property, the refractive index nd of this glass may preferably be 1.72 or less. The refractive index nd of this glass may more preferably be 1.71 or less, particularly preferably 1.70 or less.

The Abbe number vd of this glass may preferably be 47 to 57. The Abbe number vd may more preferably be 48 or more, particularly preferably 49 or more. The Abbe number vd of this glass may more preferably be 56 or less, particularly preferably 55 or less. A relationship between the refractive index nd and the Abbe number vd may preferably be such that the Abbe number vd is 50 to 55 when the refractive index nd is 1.67 to 1.71. The relationship may more preferably be such that the Abbe number vd is 52 to 54 when the refractive index nd is 1.68 to 1.70.

The glass transition temperature Tg of this glass may preferably be 580° C. or less since such glass transition temperature Tg improves durability of a metal mold and makes it easy to perform the press molding. The glass transition temperature of this glass may more preferably be 570° C. or less, particularly preferably 560° C. or less.

The liquid phase temperature (L.T.) of this glass may preferably be 950° C. or less since such liquid phase temperature (L.T.) makes it easy to prevent devitrification during pre-form forming so that this glass is suitably used for mass production. The liquid phase temperature of this glass may more preferably be 920° C. or less, particularly preferably 870° C. or less. In this invention, the liquid phase temperature (L.T.) means a lowest temperature at which microcrystal is not precipitated within a temperature range that is higher than a temperature at which the glass is softened by 100° C. or more.

The viscosity ($\eta_{L.T.}$) at the liquid phase temperature of the glass may preferably be $10^{0.5}$ dPa·s or more since such viscosity makes it easy to prevent the devitrification during the pre-form forming so that this glass is suitably used for mass production. The viscosity ($\eta_{L.T.}$) at the liquid phase temperature of the glass may preferably be $10^{0.8}$ dPa·s or more, more preferably $10^{1.0}$ dPa·s or more. Also, in view of a balance with other characteristics, the viscosity ($\eta_{L.T.}$) at the liquid phase temperature of the glass may preferably be $10^{2.4}$ dPa·s or less, more preferably $10^{2.2}$ dPa·s or less, most preferably $10^{2.0}$ dPa·s or less.

From the view point of a balance with the glass transition temperature, the average linear thermal expansion coefficient α from 50° C. to 350° C. of this glass may preferably be $60 \times 10^{-7}/°$ C. or more. The average linear thermal expansion coefficient α may more preferably be $65 \times 10^{-7}/°$ C. or more, most preferably $70 \times 10^{-7}/°$ C. or more. From the view point of prevention of crack during press molding, α may preferably be $85 \times 10^{-7}/°$ C. or less. The average linear thermal expansion coefficient α may more preferably be $80 \times 10^{-7}/°$ C. or less, most preferably $75 \times 10^{-7}/°$ C. or less.

EXAMPLES

Hereinafter, embodiments this invention will be described in detail based on examples, and this invention is not limited to the examples.

[Glass Preparation Method]

As materials for the components, an oxide, a carbonate salt, a nitrate salt, a hydroxide, and the like are used. Specifically, boric acid was used as the material for $B_2O_3$; commercially available alumina and aluminum hydroxide were used as the materials for $Al_2O_3$; and a suitable carbonate salt and a nitrate salt were used as the materials for an alkali oxide represented by $Li_2O$ and an alkali earth oxide represented by CaO. Suitable oxides were used as the materials for other components such as $La_2O_3$ and $Gd_2O_3$. The materials for the components were weighed as shown in Table 1 and Table 2, and powders of the materials were mixed sufficiently to be used as a mixed material. The mixed material was placed in a platinum crucible to be fused at a fuse temperature of 1,100° C. to 1,200° C. for one hour. This glass melt was stirred for 0.5 hour by a platinum stirrer to obtain a homogeneous fused glass, and the homogeneous fused glass was discharged to be molded into a plate-like shape, followed by retention at 570° C. for 4 hours to eliminate a residual stress. The plate-like molded glass was gradually cooled to a room temperature at a cooling rate of 1° C./min. to obtain an optical glass.

[Evaluation]

An average linear expansion coefficient α ($\times 10^{-7}/°$ C.) at a glass transition temperature Tg (° C.) in the range of 50 to 350° C. of each of samples processed into a column-like shape having a diameter of 5 mm and a length of 20 mm was measured by using a thermo-mechanical analyzer (product of MacScience; trade name: DIALTOMETER 5000) at a temperature rise rate of 5° C./min.

A refractive index nd and an Abbe number νd of each of glass blocks each having the size of 20 mm×20 mm and a thickness of 10 mm and mirror polished sides were measured by using a refractive index measurement apparatus (product of Kalnew Optical Industrial Company; trade name: KPR-2). Five places of decimals of each of the measurement values were detected. The third place after the decimal point of the refractive index nd was rounded off, and the second place after the decimal point of the Abbe number νd was rounded off.

A liquid phase temperature (L.T.) (° C.) of each of glass blocks each having the size of 10 mm×10 mm×10 mm was measured as follows. The glass block was placed on a platinum alloy dish containing 95% of Pt and 5% of Au and retained for one hour in an electric furnace of which a temperature was set to a temperature that was higher than a glass softening temperature by 100° C., followed by standing outside the furnace. The glass was observed visually or by using a microscope (×100), and a lowest temperature at which no crystal component was observed was detected as the liquid phase temperature.

A viscosity ($\eta_{L.T.}$) at the liquid phase temperature (L.T.) of each of the examples was measured by using a glass low viscosity measurement apparatus (product of Opto Co., Ltd.: trade name RVM-6). In Tables 1 and 2, "–" means that the measurement was not conducted.

Results of the above measurements are shown in Tables 1 and 2 together with the compositions. In the tables, Examples 1 to 7 are examples of this invention, and Examples 8 to 10 are comparative examples. Examples 8 and 9 are Examples 10 and 11 of JP-A-2000-16831 referred to in the column of Background Art of this specification, and Example 10 is Example 10 of JP-A-2000-119036 referred to in the column of Background Art of this specification. As compared to Examples 1 to 7, Examples 8 and 9 has lower glass transition temperatures, lower liquid phase temperatures, and higher average thermal expansion coefficients, and Example 10 has a lower glass transition temperature, a higher liquid phase temperature, and a higher average linear expansion coefficient.

TABLE 1

| | | Ex. 1 | Ex. 2 | Ex. 3 | Ex. 4 | Ex. 5 |
|---|---|---|---|---|---|---|
| Compo-sition/% | $SiO_2$ | 4.0 | 3.6 | 3.8 | 3.9 | 3.9 |
| | $B_2O_3$ | 35.5 | 35.2 | 33.2 | 34.1 | 37.7 |
| | $Li_2O$ | 2.9 | 3.0 | 5.4 | 4.4 | 4.4 |
| | ZnO | 14.9 | 12.3 | 13.2 | 14.3 | 10.4 |
| | $La_2O_3$ | 16.3 | 14.8 | 15.3 | 15.6 | 20.3 |
| | $Gd_2O_3$ | 18.1 | 16.5 | 17.0 | 17.4 | 22.6 |
| | $Al_2O_3$ | 2.9 | 3.1 | 2.8 | 2.8 | 0.0 |
| | $TiO_2$ | 0.0 | 0.2 | 0.1 | 0.1 | 0.7 |
| | CaO | 0.0 | 2.3 | 0.0 | 0.0 | 0.0 |
| | SrO | 0.0 | 1.0 | 0.0 | 0.0 | 0.0 |
| | $Bi_2O_3$ | 0.0 | 0.0 | 4.2 | 0.0 | 0.0 |
| | $ZrO_2$ | 1.2 | 1.2 | 1.1 | 1.1 | 0.0 |
| | $WO_3$ | 0.0 | 0.0 | 0.0 | 2.1 | 0.0 |
| | $Ta_2O_5$ | 4.2 | 4.5 | 4.0 | 4.1 | 0.0 |
| | $Y_2O_3$ | 0.0 | 2.3 | 0.0 | 0.0 | 0.0 |
| | $Sb_2O_3$ | 0.0 | 0.0 | 0.0 | 0.0 | 0.0 |
| | nd | 1.69 | 1.69 | 1.70 | 1.69 | 1.69 |
| | νd | 54.0 | 53.2 | 50.0 | 52.0 | 53.8 |
| | Tg/° C. | 550 | 549 | 502 | 522 | 538 |
| | L.T./° C. | 830 | 920 | 880 | 850 | 920 |
| | $\eta_{L.T.}$/dPa·s | $10^{2.0}$ | $10^{1.1}$ | — | — | $10^{1.1}$ |
| | α/×$10^{-7}$/° C. | 68.7 | 73.0 | 84.6 | 76.7 | 78.6 |

TABLE 2

| | | Ex. 6 | Ex. 7 | Ex. 8 | Ex. 9 | Ex. 10 |
|---|---|---|---|---|---|---|
| Compo-sition/% | $SiO_2$ | 4.1 | 4.1 | 9.0 | 8.0 | 17.0 |
| | $B_2O_3$ | 37.1 | 36.7 | 31.0 | 33.0 | 28.5 |
| | $Li_2O$ | 2.9 | 3.5 | 4.0 | 4.0 | 3.0 |
| | ZnO | 14.7 | 14.9 | 9.0 | 11.0 | 0.9 |
| | $La_2O_3$ | 16.9 | 16.7 | 22.0 | 20.0 | 21.0 |
| | $Gd_2O_3$ | 18.7 | 18.6 | 3.0 | 2.0 | 3.0 |
| | $Al_2O_3$ | 0.0 | 0.0 | 0.0 | 0.0 | 0.0 |
| | $TiO_2$ | 0.1 | 0.0 | 0.0 | 0.0 | 0.0 |
| | CaO | 0.0 | 0.0 | 10.0 | 10.0 | 16.0 |
| | SrO | 0.0 | 0.0 | 0.0 | 0.0 | 0.0 |
| | $Bi_2O_3$ | 0.0 | 0.0 | 0.0 | 0.0 | 0.0 |
| | $ZrO_2$ | 1.2 | 1.2 | 1.0 | 4.0 | 0.0 |
| | $WO_3$ | 0.0 | 0.0 | 0.0 | 0.0 | 0.0 |
| | $Ta_2O_5$ | 4.3 | 4.3 | 2.0 | 0.0 | 3.5 |
| | $Y_2O_3$ | 0.0 | 0.0 | 9.0 | 8.0 | 7.0 |
| | $Sb_2O_3$ | 0.0 | 0.0 | 0.0 | 0.0 | 0.1 |

TABLE 2-continued

|   | Ex. 6 | Ex. 7 | Ex. 8 | Ex. 9 | Ex. 10 |
|---|---|---|---|---|---|
| nd | 1.69 | 1.69 | 1.70 | 1.69 | 1.68 |
| vd | 53.1 | 53.0 | 53.5 | 53.5 | 56.3 |
| Tg/° C. | 561 | 550 | 537 | 528 | 571 |
| L.T./° C. | 870 | 850 | 920 | 920 | 970 |
| $\eta_{L.T.}$/dPa·s | — | $10^{1.8}$ | — | — | — |
| $\alpha/\times 10^{-7}$/° C. | 69.8 | 72.0 | 90.4 | 87.1 | 86.1 |

While the present invention has been described in detail and with reference to specific embodiments thereof, it will be apparent to one skilled in the art that various changes and modifications can be made therein without departing from the spirit and scope thereof.

This patent application is based on Japanese Patent Application No. 2006-042529 filed on Feb. 20, 2006, and the contents thereof are incorporated herein by reference.

INDUSTRIAL APPLICABILITY

This invention enables to obtain an optical glass satisfying a refractive index nd of 1.65 to 1.72, an Abbe number vd of 47 to 57, a glass transition temperature of 580° C. or less, a liquid phase temperature of 950° C. or less, and an average thermal expansion coefficient of $85 \times 10^{-7}$/° C. That is, it is possible to provide the optical glass that has the high refractive index, the low dispersion, and the excellent pre-form forming property and is less subject to occurrence of crack during press molding. Also, since it is possible to produce various optical elements without polishing after the molding by precision press molding this glass, it is possible to provide optical elements improved in productivity and advantageous in cost.

The invention claimed is:

1. An optical glass comprising, by mass %:
30 to 40% of $B_2O_3$;
2.5 to 6% of $Li_2O$;
10 to 17% of ZnO;
12 to 22% of $La_2O_3$;
15 to 25% of $Gd_2O_3$;
0 to 5% of $SiO_2$;
0 to 5% of $Bi_2O_3$;
0 to 15% of $Al_2O_3$;
0 to 3% of $ZrO_2$;
0 to 5% of $WO_3$;
0 to 5% of $Ta_2O_5$;
0 to 3% of $TiO_2$;
0 to 5% of $Y_2O_3$; and
0 to 5% of MgO+CaO+SrO+BaO,
wherein an average linear thermal expansion coefficient ($\alpha$) from 50 to 350° C. is $85 \times 10^{-7}$/° C. or less.

2. The optical glass according to claim 1, wherein a refractive index (nd) is 1.65 to 1.72 and an Abbe number (vd) is 47 to 57.

3. The optical glass according to claim 1, wherein a glass transition temperature (Tg) is 580° C. or less.

4. The optical glass according to claim 1, wherein a liquid phase temperature (L.T.) is 950° C. or less.

5. The optical glass according to claim 1, wherein a viscosity ($\eta_{L.T.}$) at the liquid phase temperature (L.T.) is $10^{0.5}$ to $10^{2.4}$ dPa·s.

6. The optical glass according to claim 1, wherein the $B_2O_3$ is present in an amount of from 33.2 to 38%.

7. The optical glass according to claim 1, wherein the $Li_2O$ is present in an amount of from 2.9 to 5.4%.

8. The optical glass according to claim 1, wherein the ZnO is present in an amount of from 10.4 to 15.5%.

9. The optical glass according to claim 1, wherein the $La_2O_3$ is present in an amount of from 14.8 to 20.3%.

10. The optical glass according to claim 1, wherein $Gd_2O_3$ is present in an amount of 16.5 to 22.6%.

11. The optical glass according to claim 1, wherein $SiO_2$ is present in an amount of 0.1% or more.

12. The optical glass according to claim 1, wherein each of BaO, MgO, CaO and SrO or the sum of the contents thereof are present in an amount of 0.1% or more.

13. The optical glass according to claim 1, wherein each of $Na_2O$ and $K_2O$ or a sum of the contents thereof are present in an amount of 0.1% or more.

14. The optical glass according to claim 1, wherein each of $Bi_2O_3$, $ZrO_2$, $WO_3$, $Ta_2O_5$, $TiO_2$ and $Y_2O_3$ is present in an amount of 0.1% or more.

15. The optical glass according to claim 1, wherein $Al_2O_3$ is present in an amount of 0.1% or more.

16. The optical glass according to claim 1, wherein $Sb_2O_3$ is present in an amount of 0.1% or more.

17. The optical glass according to claim 1, wherein none of PbO, $As_2O_3$ or $TlO_2$ are present.

18. The optical glass according to claim 2, wherein the refractive index (Nd) is from 1.68 to 1.70 and the Abbe number (vd) is 52 to 54.

19. The optical glass according to claim 3, wherein the glass transition temperature (Tg) is 560° C. or less.

20. The optical glass according to claim 4, wherein the liquid phase temperature (l.t.) is 870° C. or less.

* * * * *